March 5, 1957 L. A. CUMMARO 2,783,811
EXTERNALLY THREADED INSERT ELEMENT
AND KEYED LOCKING RING THEREFOR
Filed Aug. 10, 1953 2 Sheets-Sheet 1
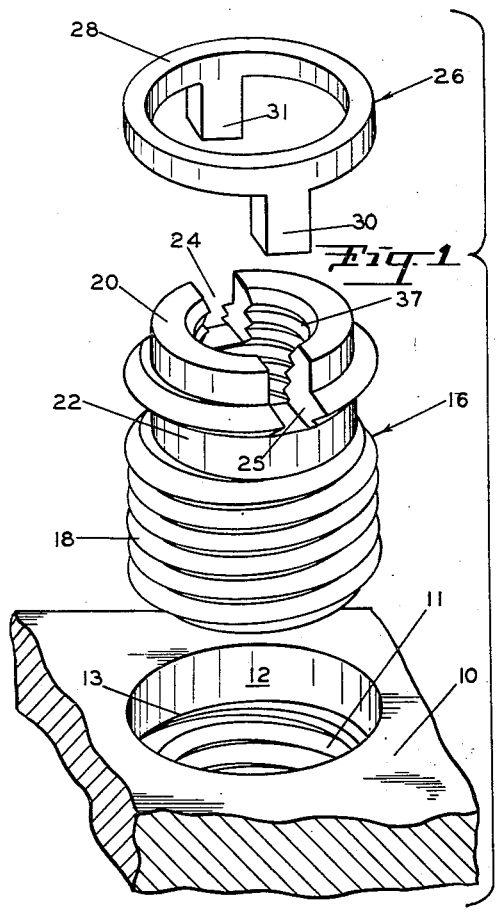
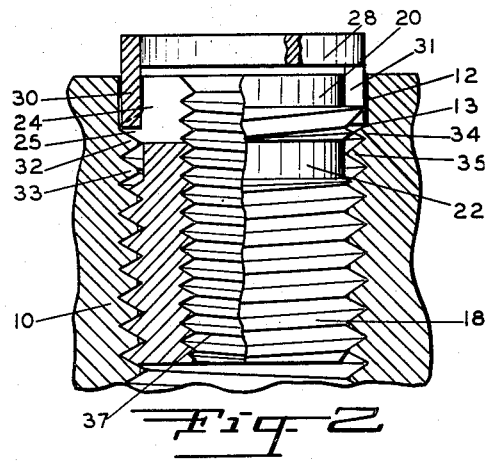
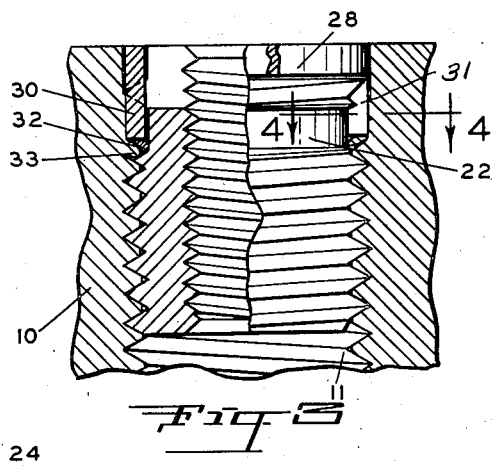
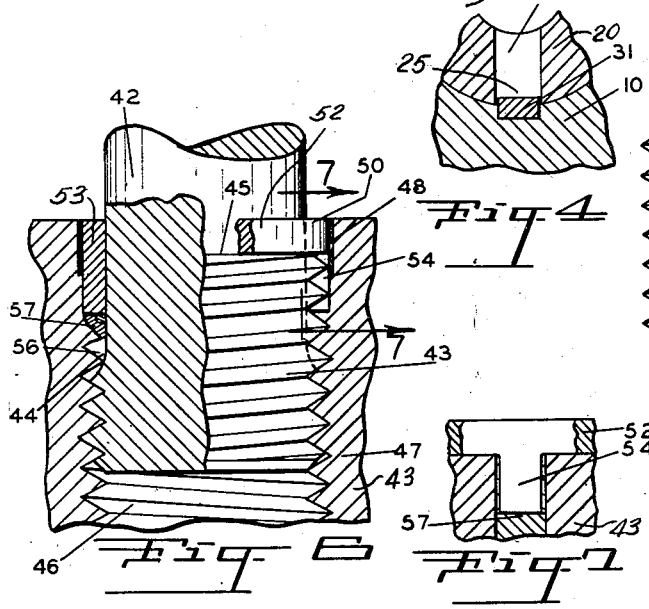
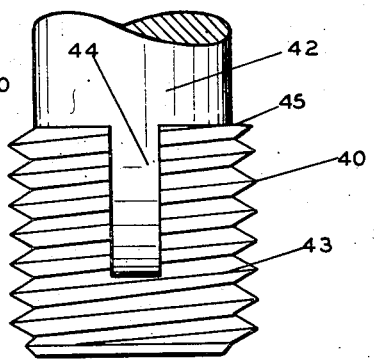
INVENTOR.
LOUIS A. CUMMARO
BY
Buckhorn and Cheatham
ATTORNEY March 5, 1957
L. A. CUMMARO
2,783,811
EXTERNALLY THREADED INSERT ELEMENT
AND KEYED LOCKING RING THEREFOR
Filed Aug. 10, 1953
2 Sheets-Sheet 2
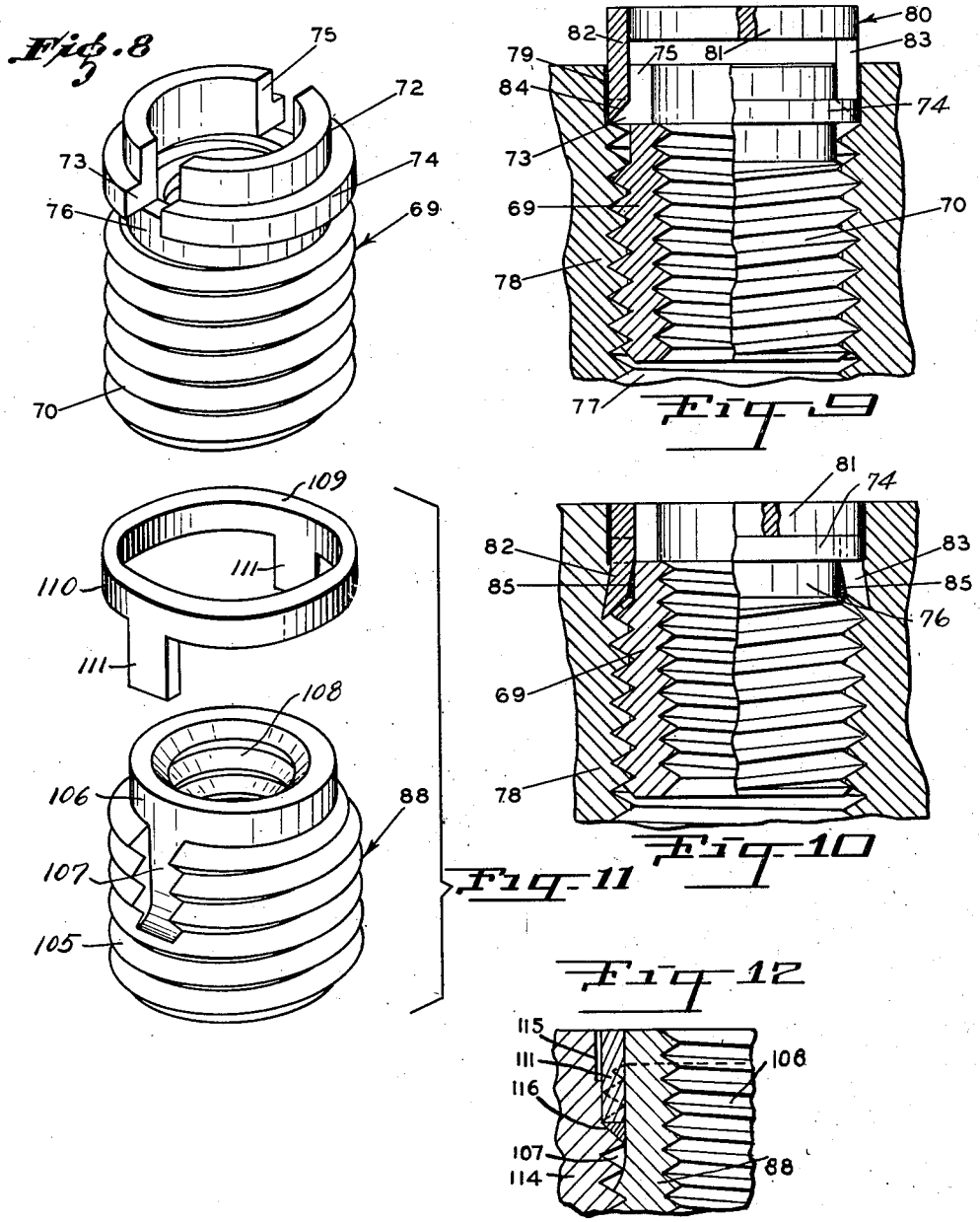
INVENTOR.
LOUIS A. CUMMARO
BY
Buckhorn and Cheatham
ATTORNEY United States Patent Office 2,783,811
Patented Mar. 5, 1957

2,783,811

EXTERNALLY THREADED INSERT ELEMENT AND KEYED LOCKING RING THEREFOR

Louis A. Cummaro, Bronxville, N. Y., assignor to Phillips Screw Company, New York, N. Y., a corporation of Delaware Application August 10, 1953, Serial No. 373,172

6 Claims. (Cl. 151—41.73)

The present invention relates to means for securing fastening elements to a body of relatively soft material such as a soft metal, and more particularly relates to threaded fasteners adapted to be installed in such a body and to means for locking the fasteners to the body.

Aluminum and magnesium and their alloys are being used extensively in applications where lightness is desired. However, these materials are relatively soft, and in threading a connecting element, such as a stud, into a body formed thereof there is always the danger of galling the threads in the body. This is particularly true, of course, where the connected element must be frequently assembled and disassembled, as, for example, in the case of spark plugs in aircraft engines. Hard metal fasteners provided with an internal thread or projecting stud, as desired, have been provided heretofore for permanent installation in bodies of soft materials whereby repeated connection and disconnection may be made with the fastener to alleviate the possibility of destroying the threads in the soft metal body. However, such previous fasteners have been undesirable for various reasons including their complexity and attendant high cost of manufacture, difficulty of installation, and inherent structural weaknesses in the fastener. Moreover, installation of fasteners as provided heretofore has created stress concentrations in the parent body, weakening the same and limiting the use of such fasteners.

It is a principal object of the present invention, therefore, to provide a new and improved fastener and locking means therefor for forming a permanent anchorage in a relatively soft body.

A further object of the invention is to provide a new and improved fastener and locking means of the class described that is relatively simple and which may be manufactured at a relatively low cost.

Another object of the invention is to provide a threaded fastener and locking member adapted to be quickly and easily installed in a parent body and adapted to be easily removed from the parent body without the need of special tools.

Still another object is to provide a fastener that does not create lateral stress concentrations in the parent body of soft material.

Other objects and advantages of the invention will become more apparent hereinafter.

In accordance with the present invention, an externally threaded fastener is provided which may be threaded into a cooperatively threaded aperture provided in the parent body in which an anchor is desired. The periphery of the fastener is provided with a plurality of axially parallel grooves or keyways extending inwardly from its outer end. A locking member for the fastener is provided comprising a ring portion having a plurality of prongs or keys adapted to fit within said keyways and to cut a companion keyway through the opposing threads of the parent body upon insertion of the locking member whereby the fastener is locked against rotation.

For a more detailed description of the invention, reference is made to the accompanying drawings wherein:

Fig. 1 is an exploded perspective view showing a tubular fastener, a locking member therefor, and the counterbored aperture in the parent body in which the fastener and locking member are received;

Fig. 2 is a side elevation of the fastener and locking member of Fig. 1, showing the fastener installed in the parent body and the locking member in position to be driven into the counterbore of the aperture in the parent body, a portion of the fastener and locking member being shown in longitudinal medial section, the parent body being shown in section in the plane of said medial section;

Fig. 3 is a view similar to Fig. 2 showing the locking member in the fully inserted position;

Fig. 4 is a fragmentary sectional view taken along line 4—4 of Fig. 3;

Fig. 5 is a side elevation of a fastener having an integral stud;

Fig. 6 is a further side elevation of the fastener of Fig. 5 rotated a quarter turn relative to its position in Fig. 5, and showing it installed in a body of parent material, a portion of the fastener and locking member therefor being shown in longitudinal medial section;

Fig. 7 is a sectional view taken along line 7—7 of Fig. 6;

Fig. 8 is a perspective view of a modified tubular fastener;

Fig. 9 is a side elevation of the fastener of Fig. 8 and a modified locking member showing the fastener installed in the parent body with the locking member in position to be forced into engagement with the fastener, the view being partially in medial cross-section;

Fig. 10 is a view similar to Fig. 9 showing the locking member in operative engagement with the fastener and parent body;

Fig. 11 is a perspective view of a further modified fastener and locking member therefor;

Fig. 12 is a fragmentary longitudinal medial sectional view of the fastener and locking member of Fig. 11 showing the same installed in a parent body.

With reference first to the embodiment of the invention illustrated in Figs. 1 to 3, inclusive, the numeral 10 designates a parent housing or body of soft material such as aluminum, magnesium, or an alloy of these metals, into which it is desired to install a fastener of a harder metal or other suitable material. For reception of the present embodiment of the invention, the body 10 is formed with an aperture extending inwardly from a surface of the body and including a threaded portion or opening 11 and with a thread-relieved portion or counterbore 12 extending inwardly from the body surface a predetermined depth, as will be later described, and defining an annular shoulder 13 at its juncture with the opening 11.

The threaded element or fastener 16 of the presently described embodiment is shown as being a female type and of generally tubular form and having an externally threaded inner end or lower section 18 adapted to be threaded into the opening 11 and having a substantially cylindrical head portion 20 formed on the upper or outer end thereof. Preferably the head 20 is of a diameter substantially equal to the root diameter of the threaded section 17 and thus, in a sense, comprises a thread-relieved portion of the fastener. The threaded section 18 is provided with a thread-relieved section of substantially one thread pitch to form an unthreaded neck 22 spaced preferably a thread pitch benath the head 20, though the exact positioning of the neck 22 is not critical, as will become apparent. Preferably the neck 22 is formed so as to have a diameter substantially equal to the diameter of the head 20. Extending inwardly from the head of the fastener is a transverse slot or recess 24 adapted to receive a tool in installing the fastener, and which recess is of a depth so as to extend through the portion of the threaded section between the head 20 and neck 22, and preferably terminates at the upper end of the neck so that the threaded portion between the neck and head define a pair of diametrically opposite, axially extending slots or keyways 25, the purpose of which will be more fully explained hereinafter.

Preferably in installing the fastener 20 the counterbore 12 is bored to a depth substantially equal to the height of the fastener head 20 plus one half the pitch of the external threads formed on the fastener, and the fastener 16 is installed in the parent body so that the upper end thereof is just flush with or very slightly below the outer surface of the body 10 whereby the fastener head 20 and substantially half a thread of the threaded fastener section 18 will be positioned within the counterbore, as best shown in Fig. 2.

The locking member for locking the fastener 16 against rotation of the body 10 is indicated generally by the reference numeral 26 and comprises a ring portion 28 adapted to be received cooperatively within the counterbore 12, the aperture of the ring being adapted to receive the fastener head 20. Projecting from the inner end surface of the ring portion are a pair of oppositely disposed keys 30, 31 which extend substantially parallel to the axis of the ring. Preferably the length of the keys is just slightly less than twice the pitch of the external threads of the fastener, and preferably they are of just slightly lesser width than the width of the transverse recess 24 (Fig. 4), and may be of substantially the same thickness as the radial thickness of the ring portion 28. In the preferred embodiment the ends of the keys are substantially flat and at right angles to the longitudinal axis of the keys.

To engage the locking member 26 with a fastener 16 installed in a parent body, the locking member is positioned in coaxial alignment with the fastener with the keys 30, 31 of the locking member inserted in the keyways 25 of the fastener, as best shown in Fig. 2. The locking member 26 is then forced inwardly relative to the fastener 16 and body member 10 by any suitable means until the top surface of the locking member is substantially flush with the surface of the body 10. As is evident, the downward movement of the keys 30, 31 is impeded by the threads of the parent body immediately beneath the counterbore 12 and, in their downward movement, the keys shear or cut a groove or keyway through the portion of the threads of the parent body in their path of movement. As indicated in Figs. 2 and 3, the portion 32 of the uppermost parent body thread immediately beneath the key 30 is sheared off completely as the key 30 is moved downwardly, some of the material of the sheared thread being displaced laterally (and not shown) into the free space afforded by the neck 22 and some of it being forced downwardly beneath the key 30 as indicated by the cross-hatched fragment in Fig. 3. Likewise, the portion 33 of the next lower thread beneath the key 30 is partially sheared and deformed by the downward movement of the key. In a similar manner the portion 34 of the uppermost thread beneath the key 31 is completely sheared off and moves downwardly as the locking member is inserted in place and the portion 35 of the next lower thread is deformed and partially sheared, as indicated in Fig. 3. Thus, as most clearly shown in Fig. 4, each of the keys of the locking member is engaged in the respective keyway 25 of the fastener and the keyway which the key has cut through the threads of the body member 10, whereby the fastener is effectively locked against rotation. The locking member is securely held in position by the frictional engagement of the keys thereof with the material of the parent body and will not become loose even after long periods of vibration. While the keys 30, 31 effectively restrain the insert against rotation, it will be seen that screw-threaded engagement of the fastener 16 in the parent body secures the insert against longitudinal displacement.

The fastener 16 is shown as having a screw-threaded bore 37 adapted to receive cooperatively a threaded stud or other member which is to be anchored in the parent body.

A male or stud type fastener 40 embodying the invention is illustrated in Figs. 5, 6 and 7. The fastener 40 is provided with a stud or shank 42 projecting from an externally threaded section 43 and to which shank connection may be made in any desired and known manner. Preferably the shank 42 is substantially equal to the root diameter of the fastener threads. The threaded section 43 is provided with a pair of longitudinally extending, diametrically oppositely positioned slots or keyways 44 through the threaded section 43 and which keyways open through the shoulder 45 defined by the threads and stud shank 42. The stud fastener 40 is adapted to be installed in a cooperatively threaded aperture 46 (Fig. 6) formed in a parent body member 47 and is adapted to be locked in position by a locking member 50 (Fig. 6) substantially similar to that shown in Fig. 1 and comprising a ring portion 52 and a pair of keys 53, 54. The aperture 46 is provided with a thread relief or counterbore 48 from the surface of the body having a depth substantially equal to the height of the ring portion 52 plus one half the pitch of the fastener threads.

In installing the stud fastener 40 in a parent body 47, it is screwed into the tapped aperture 46 until the shoulder 45 of the fastener is positioned below the surface of the body by a distance substantially equal to the height of the ring portion 52 of the locking member 50. This spaces the stud fastener shoulder 45 above the counterbore shoulder by a distance substantially equal to half the thread pitch of the fastener threads. The locking member 50 is then slipped over the free end of the shank 42 and the keys 53, 54 engaged in the portion of the keyways 44 projecting into the counterbore 48. The locking member 50 is then forced downwardly by any suitable means relative to the fastener and parent body until the ring portion 52 is flush with the surface of the parent body, causing the keys to cut a keyway through the threads of the parent body in substantially the same manner as described hereinbefore. Preferably the keys are of a length substantially equal to two thread pitches while the keyways 44 of the fastener are substantially longer so as to provide a clearance space 56 beneath the keys for the displaced chips 57 of the thread, as indicated in Figs. 6 and 7.

Fig. 8 illustrates a modified tubular fastener 69 formed with a collar or flange to facilitate positioning of the fastener in the body aperture. This fastener comprises a threaded inner portion 70 and a thread-relieved outer or head portion 72. Projecting outwardly from the fastener immediately beneath the head portion 72 is a flange or collar 74 preferably of a diameter substantially equal to the peak diameter of the threaded portion 70. Preferably the fastener 69 is relieved of its threads immediately beneath the flange 74 to provide a short unthreaded neck 76.

Formed in the head portion 72 and the flange 74 of the fastener 69 is a transverse slot or recess 75 adapted to receive a tool for installing the fastener, the portion of the recess 75 in the flange portion being further adapted to provide slots or guideways 73 for the fastener locking member as will be described more fully.

The fastener 69 is adapted to be inserted or installed in a tapped aperture 77 in a parent body 78 provided with a counterbore 79 having a depth substantially equal to the height of the head portion 72 and the thickness of the flange 74, as shown in Fig. 9. While the fastener 69 is adapted to be secured against rotation by a locking member substantially similar to the locking member of the previously described embodiments of the invention, it is shown in Figs. 9 and 10 in connection with a slightly modified locking member 80 comprising a ring portion 81 and keys or projecting prong elements 82, 83 and which differs from the locking members of the previously described embodiments in that the lower end of each of the prong elements 82, 83 thereof is beveled upwardly and inwardly of the prong element, as indicated by the numeral 84, whereby the prong elements are provided with a relatively sharp point on their outer edge. The prong elements 82, 83 differ in one other respect in that they are relatively longer than the keys of the previously described locking members. It is to be understood, however, that the fastener 69 is adapted for use with a locking member substantially similar to the locking member 26 shown in Fig. 1, and, similarly, the fasteners shown and described in connection with Figs. 1 through 7 and those to be described hereinafter are adapted to be used with locking members substantially similar to the locking member 80.

The installation procedure of the fastener 69 and locking member 80 is as follows: The fastener is threaded into the body aperture 77 until the flange 74 engages the shoulder of the counterbore 79. The locking member 80 is then positioned coaxially of the fastener and the lower ends of the prong elements 82, 83 engaged in the slots or guideways 73 in the flange 74, as shown in Fig. 9, after which it is forced inwardly of the parent body by suitable means until the ring portion 81 thereof is flush with the surface of the parent body, as shown in Fig. 10. In moving downwardly, the prong elements 82, 83 will sever a keyway through the threads of the body aperture 77, the pointed ends on the prongs facilitating the severance of the threads. The bevel on the prongs 82, 83 serves an additional function in that, as the material indicated at 85 from the severed threads accumulates beneath the prongs, the reaction on the prongs will tend to force them outwardly as shown in Fig. 10. Preferably, though not necessarily, the prongs 82, 83 are of such length as to extend slightly below the neck portion 76 of the insert 69 when the locking member is in the fully engaged position whereby the resistance of the hard metal of the fastener will insure movement of the prongs outwardly into the parent body beyond the roots of the threads thereof. The projection of the prongs into the main portion of the parent body will, of course, increase the resistance of the fastener and locking member to rotation.

Obviously, the fastener 69 is adapted to be formed as a solid type of fastener with a projecting stud or shank, in which case the fastener would be formed without a transverse recess but only with a pair of oppositely disposed slots through the flange 74 and through which the keys of the locking member may be received.

In Figs. 11 and 12 is shown still another modification of a tubular, internally threaded type of fastener similar in certain respects to the stud fastener of Figs. 5 through 7. The fastener 88 comprises an externally threaded inner portion 105 and an outer or head portion 106 having a diameter substantially equal to the root diameter of the threaded portion 105. The threaded portion 105 is provided with a pair of diametrically oppositely positioned slots or keyways 107 which extend parallel to the axis of the fastener downwardly from the head portion 106 for about three or four thread pitches. The keyways may be formed by milling the slot through the threads to the depth of the root diameter thereof. Fastener 88 is provided with internal threads 108 for receiving a bolt or other cooperatively threaded device.

The fastener 88 is adapted to be secured against rotation when installed in a parent body by a locking member 109 substantially similar to the locking members 26 and 50, described hereinbefore. The locking member 109 comprises a ring portion 110 having a height substantially equal to the height of the head portion 106. Projecting from the ring portion 110 are a pair of elongate prong elements or keys 111. Preferably the length of the keys 111 is substantially less than the length of the keyways 107, the reasons for which will become more apparent.

Referring now more particularly to Fig. 12, the fastener 88 is installed in a parent body 114 by threading the fastener into a cooperatively threaded aperture formed in the parent body and having a counterbore 115 of a depth of about a half of a thread pitch greater than the height of the head portion 106. The fastener is threaded inwardly until the top thereof is substantially flush with the surface of the body 114 whereby a portion of the keyways 107 will project above the threads of the parent body and into the counterbore 115. The locking member 109 is then arranged axially of the fastener with the keys 111 engaged in the portions of the keyways 107 projecting into the counterbore whereafter the locking member is forced downwardly in respect to the fastener and parent body which will cause the keys 111 to cut a keyway through the threads of the parent body. The keys 111 preferably are shorter than the keyways 107 to provide clearance space in the keyways below the keys for the material sheared from the threads of the parent body which material is indicated at 116.

An important advantage in connection with the fastener and locking member of the present invention is that the installation thereof in a body of parent materials does not create stress concentrations in the body. The fastener, for example, is adapted to be installed in an aperture into which the fastener may be threaded without forcing the same. Moreover, the ring portion of the locking member is preferably formed to clear relatively freely the counterbore so that lateral stresses are not created in the parent material by forcing the ring of the locking member into position. Thus, the only portions of the parent body which are disturbed by the installation of the locking member and fastener are the aforementioned severed portions of the thread of the parent body, and which portions are relatively minor whereby any stress concentrations that may be created are totally insignificant. The result is that the fastener of the invention may be installed closer to an edge of a parent body than has been possible to install fasteners provided heretofore. Also, it has been necessary to provide reinforced bosses in certain installations of the fasteners provided heretofore, which reinforcement is not necessary or at least can be minimized with the use of the fastener of the invention, thereby effecting a decrease in the overall weight of the parent body. The fastener of the invention can be manufactured, moreover, easily and at a relatively low cost.

Removal of a fastener of the invention from a parent body is relatively easily accomplished. Referring to the fastener and locking member of Fig. 3, for example, if it is desired to remove the fastener 16 the assembly is drilled from the surface of the body to a depth equal to the depth of the keys 30, 31 with a drill having a diameter equal to the outer diameter of the locking member ring portion 28. The locking member 26 is thus entirely drilled out after which the fastener 16 may be removed with an "easy-out" or similar device.

Having illustrated and described preferred embodiments of the invention, it should be apparent to those skilled in the art that the invention permits of modifications in arrangements and details. I claim as my invention all such modifications as come within the true spirit and scope of the appended claims.

I claim:

1. The combination comprising a male part including a threaded portion and an adjacent cylindrical head portion of a diameter less than the peak diameter of said threaded portion, a female part having a threaded aperture for receiving said male threaded portion, said aperture being counterbored, said head portion being adapted to be positioned opposite said counterbore, one of said parts having a plurality of axially parallel grooves in the threads thereof, and a member for locking said parts against rotation comprising a ring portion formed to fit snugly between said head portion and the wall of said counterbore, and a plurality of keys extending from said ring portion and adapted to engage one in each of said grooves and to be driven through the threads of the other part.

2. A threaded element adapted for mounting in a parent body formed with a threaded opening and a coaxial counterbore, said element including a threaded section adapted for engagement within said opening and a coaxial cylindrical head section adapted to be disposed within said counterbore and having a diameter substantially less than the peak diameter of said threaded section, said element having a plurality of axially parallel key slots formed in the outer surface thereof, said slots extending a predetermined distance into said threaded section from the end thereof adjacent said head section, and a locking member including a ring portion having inner and outer end surfaces and adapted to be received within said counterbore coaxially of said head section, said locking member having a plurality of axially parallel keys projecting from said inner end surface adapted to be received cooperatively within said slots and being further adapted to be forced through the thread-defining portions of said body whereby to lock said element against rotation relative to said body.

3. A threaded element adapted for mounting in a parent body formed with a threaded opening and a coaxial counterbore, said element including a threaded section adapted for engagement within said opening and a coaxial cylindrical head section adapted to be disposed within said counterbore and having a diameter substantially less than the peak diameter of said threaded section, said element having a plurality of axially parallel key slots formed in the outer surface thereof, said slots extending a predetermined distance into said threaded section from the end thereof adjacent said head section, said element having an annular groove thereabout at the base of said slots, and a locking member including a ring portion having inner and outer end surfaces and adapted to be received within said counterbore coaxially of said head section, said locking member having a plurality of axially parallel keys projecting from said inner end surface adapted to be received cooperatively within said slots and being further adapted to be forced through the thread defining portions of said body whereby to lock said element against rotation relative to said body.

4. A threaded element adapted for mounting in a parent body formed with a threaded opening and a coaxial counterbore, said element including a threaded section adapted for engagement within said opening and a coaxial cylindrical head section adapted to be disposed within said counterbore and having a diameter substantially less than the peak diameter of said threaded section, said element having a plurality of axially parallel key slots formed in the outer surface thereof, said slots extending a predetermined distance into said threaded section from the end thereof adjacent said head section, said element having a peripheral flange between said head section and said threaded section adapted to engage the lower end of said counterbore to position the element therein, the portion of said threaded section immediately beneath said flange being thread-relieved to define an annular groove about said element, and a locking member including a ring portion having inner and outer end surfaces and adapted to be received within said counterbore coaxially of said head section, said locking member having a plurality of axially parallel keys projecting from said inner end surface adapted to be received cooperatively within said slots and being further adapted to be forced through the thread defining portions of said body whereby to lock said element against rotation relative to said body.

5. In combination, a cylindrical fastener, a body having a surface and a threaded aperture from said surface receiving said fastener, said fastener comprising an externally threaded inner end portion and a cylindrical head portion having a diameter substantially less than the peak diameter of said inner end portion, said fastener having a plurality of axially parallel slots extending downwardly from said head portion through the external threads of said inner end portion, a locking member for locking said fastener to said parent body comprising a ring portion surrounding said head portion and seated against said inner end portion and a plurality of keys extending one into each of said slots and into key ways in the threads of said aperture formed by driving the keys through the same, said body aperture being counterbored from said surface for a depth slightly greater than the length of said locking member ring portion, said fastener being positioned in said aperture with the top of the inner end portion spaced from said body surface by a distance substantially equal to said ring portion length and with the top part of said inner end portion positioned in said counterbore, said keys being of a length at least as great as the depth of said counterbore, thereby facilitating their engagement in said slots during installation of the locking member.

6. In combination, a cylindrical fastener, a body having a surface and a threaded aperture from said surface receiving said fastener, said fastener comprising an externally threaded inner end portion and a head portion having a diameter substantially equal to the root diameter of said inner end portion, said fastener having a plurality of axially parallel slots extending downwardly from said head portion through the external threads of said inner end portion, a locking member for locking said fastener to said parent body comprising a ring portion surrounding said head portion and seated against said inner end portion and a plurality of keys extending one into each of said slots and into key ways in the threads of said aperture formed by driving the keys through the same, said ring portion having an outer diameter of said inner end portion threads, said body aperture being formed with a counterbore from said surface having a diameter substantially equal to the peak diameter of said inner end portion and a depth slightly greater than the length of said locking member ring portion, said fastener being positioned in said aperture with the top of said inner end portion spaced from said body surface by a distance substantially equal to said ring portion length and with the top part of said inner end portion positioned in said counterbore, said keys being of a length at least as great as the depth of said counterbore, thereby facilitating their engagement in the ends of said slots exposed in said counterbore during installation of the locking member.

References Cited in the file of this patent

UNITED STATES PATENTS

| | | |
|---|---|---|
| 697,416 | Sutherland | Apr. 8, 1902 |
| 1,064,527 | Norris | June 10, 1913 |
| 1,829,293 | Olson | Oct. 27, 1931 |
| 2,172,350 | Heyner et al. | Sept. 12, 1939 |
| 2,358,783 | Best | Sept. 26, 1944 |
| 2,367,399 | Isakson | Jan. 16, 1945 |
| 2,400,318 | Rosan | May 14, 1946 |
| 2,400,348 | Greene | May 14, 1946 |
| 2,492,536 | Rosan | Dec. 27, 1949 |

OTHER REFERENCES

Serial No. 382,653, Ozuka, (A. P. C.), published May 11, 1943 (now abandoned).